C. H. KÖHN.
MOTOR PLOW.
APPLICATION FILED JAN. 11, 1910.
992,736.
Patented May 16, 1911.
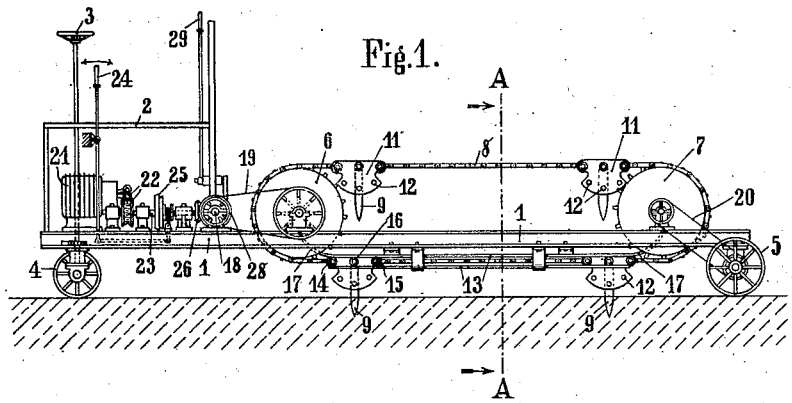
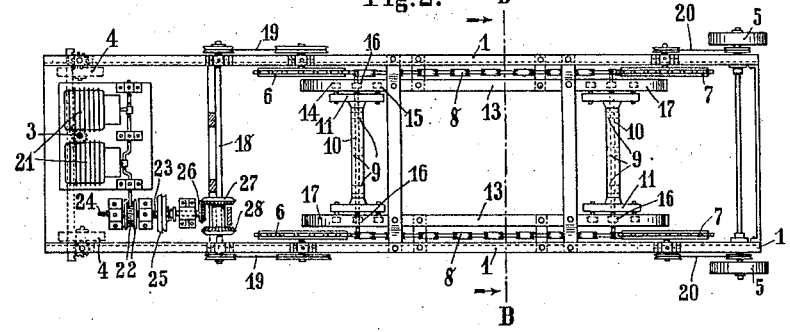
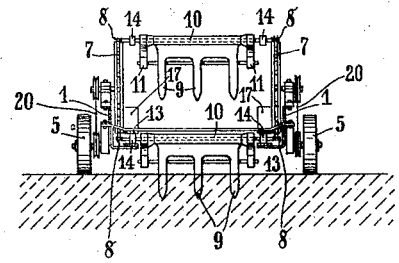
Witnesses:
Alfred P. Anderson.
John N. Hoving.
Inventor:
Claus Hinrich Köhn,
by
W. H. Berrigan.
Attorney.

UNITED STATES PATENT OFFICE.

CLAUS HINRICH KÖHN, OF STADE, GERMANY.

MOTOR-PLOW.

992,736.  Specification of Letters Patent.  Patented May 16, 1911.

Application filed January 11, 1910. Serial No. 537,536.

*To all whom it may concern:*

Be it known that I, CLAUS HINRICH KÖHN, a subject of the German Emperor, and resident of Stade, Germany, have invented a certain new and useful Improvement in Motor-Plows, of which the following is a specification.

In the specification of my co-pending application for patent Serial No. 510611, is described a traction engine comprising an extended frame mounted on wheels between the longitudinal members of which frame are mounted carriages movable in opposite directions said carriages being each provided with a sprag which digs into the ground when its carriage reaches the forward end of the frame, so that the carriage is arrested and the vehicle frame is itself moved forward relatively to the carriage until the rear end of the frame reaches the carriage. In this position the actuating mechanism must be reversed so that the arrested carriage will move forward again and the other carriage will be arrested and the frame travel relatively to the arrested carriage. This construction has, however, the disadvantage that at the moment the carriages reach their extreme positions reversal of the actuating mechanism must be effected and the actuating mechanism is thus liable to be strained and be subjected to shocks whereby the gears are apt to become worn if not broken.

According to the present improvement, instead of being fitted to carriages movable backward and forward, anchors, sprags, blades or the like are provided on chains running continuously in one direction, thus allowing of a continuous uninterrupted forward movement of the motor vehicle without any shocks on the gears.

In the accompanying drawing which illustrates the invention, Figure 1 is a side view, Fig. 2 is a plan and Fig. 3 a section on the line A—A of Fig. 1 or B—B of Fig. 2.

Referring to the drawings, 1 represents the motor vehicle frame having front wheels 4 controllable in known manner by a steering wheel 3 from the driver's seat, and having rear wheels 5. The front wheels 4 (or one of the same) may also be vertically adjustable to correspond to the different furrows in case the wheels are intended to run in the furrows themselves.

Close against the inner sides of the longitudinal members of the frame are arranged chain or belt pulleys 6 and 7, around which pass endless chains 8, ropes, belts or the like. To these chains 8 are secured the anchors or sprags 9 which are adapted to dig substantially vertically into the ground. To links of the chains 8 are fitted transverse rods 10 the ends of which are preferably formed in the same manner as the pins in the chain.

Between plates 11 mounted on the rods 10 are arranged sprags 9, which can be placed in different positions on the plates 11 by rods passed through holes 12 in the plates 11 and in the sprags 9, said holes registering with one another. An approximately vertical position of the sprags 9 is preferred, so that the pressure exerted by them on the ground is in a horizontal direction and tearing up of the ground is thereby avoided. On rotation of the sprockets 6 and 7 and corresponding movement of the chains 8, the sprags 9 which are firmly connected with the plates 11 and are suspended on the rods 10 in the same manner as the plates 11 are moved therewith, or when the sprags 10 are stationary, the motor vehicle frame moves together with the sprockets 6 and 7 longitudinally relatively to the sprags 9. As the sprags 9 and the plates 11 are adapted to swing about the rods 10, fixed guides 13 must be provided in which the plates 11 with corresponding supporting rollers 14 and 15 engage in such manner that swinging movement of the sprags 9 is impossible so long as the rollers run in the guides 13 in one or other direction. According to the direction of movement of the chains 8, either the left or the right hand rollers will rest on the upper guide 13. The guides 13 are strongly constructed so that they may withstand the back pressure exerted by the ground.

The ends of the rods 10 which project beyond the guides 13 are preferably provided with supporting rollers 16 which run in the guides 13. The ends 17 of the upper sides of the guides 13 are turned upward in order that on movement of the rollers along the guides, the sprags can be withdrawn from the earth in the end position although they are firmly held when the rollers run in the straight parts of the guides.

The sprockets 6 are driven by a shaft 18 through the medium of a chain or belt drive 19 while the rear sprockets 7 are driven by the chains 8. If the traction engine is to be run idly over a road the rods 10 are removed the sprags 9 folded up and the rods replaced so that the sprags do not contact with the ground. The rear wheels are then driven by the shaft 18 from the sprockets 6 and the chains 8 while the sprockets 7 can be connected with the rear wheels 5 of the vehicle by chain or belt drive 20. The chain drive 20 is rendered inoperative by removal of said chain.

The driving shaft 18 is driven by a motor and can be rotated at a small number of revolutions. To this end the motor 21 mounted in the forward part of the frame 1 of the motor vehicle, operating through the medium of a worm drive 22, actuates a shaft 23 and drives a bevel pinion 26 by means of a clutch 25 adapted to be disengaged by the driver by operation of a lever 24. In this bevel wheel may engage one of the bevel wheels 27 or 28 which are axially movable on the shaft 18 but are coupled on rotation according to the position of these bevel wheels their position being controlled in known manner by the driver through the lever 29. By this arrangement it is thus possible to drive the vehicle backward and forward both during use of the sprags, or after folding them up and connecting the chain drive 20 with the back wheels 5.

Having described my invention what I claim and desire to secure by Letters Patent of the United States is:

In a traction engine, in combination, a frame, front and rear wheels on said frame, a motor on said frame, pulley devices located on both sides of said frame at the front and at the rear ends thereof, tensile members passed around said pulley devices, transverse rods fitted to said tensile members, plates mounted on said rods, sprags fitted between the plates, said sprags adapted to dig substantially vertically into the ground, guides having upturned ends and straight intermediate portions, rollers connected with said plates and adapted to run in said guides, a shaft, and operative connections between said shaft and front pulley devices, reversible connections between said motor and said shaft.

In testimony whereof I have signed my name to this specification in the presence of two subscribing witnesses.

CLAUS HINRICH KÖHN.

Witnesses:
RUDOLPH FRICKE,
SOUTHARD P. WARNER.